No. 668,856. Patented Feb. 26, 1901.
J. LEVRECHON.
HEATING APPARATUS.
(Application filed Oct. 8, 1900.)
(No Model.)
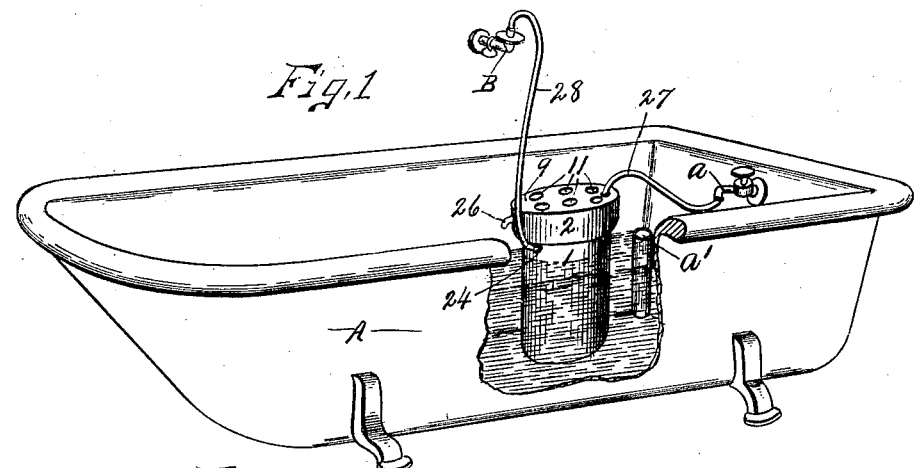
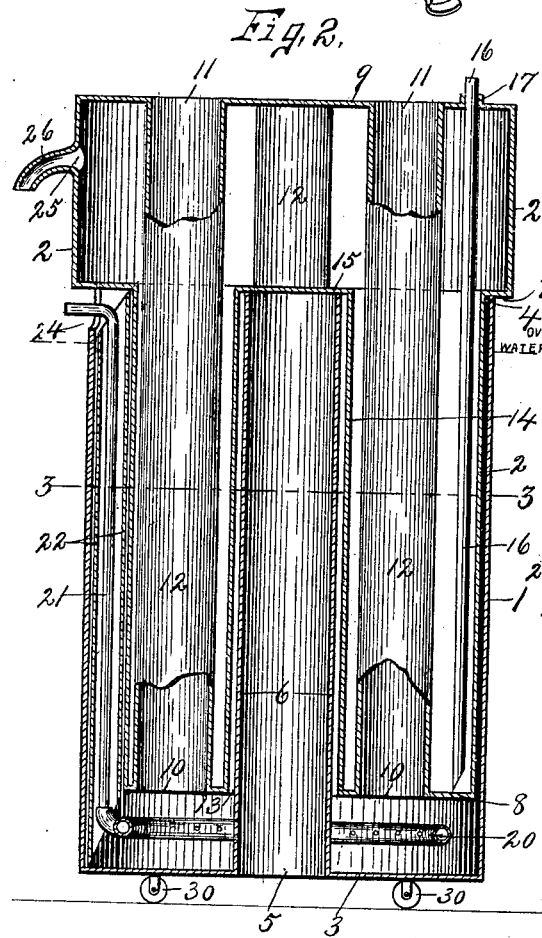
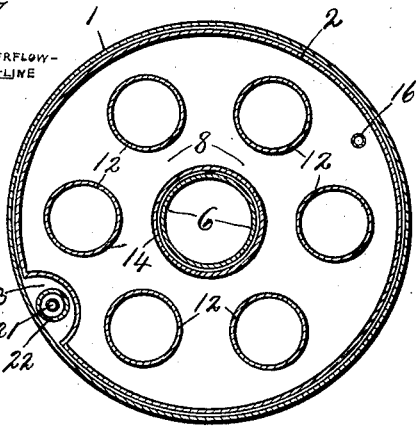
WITNESSES:
INVENTOR
Jules Levrechon
BY
Smith & Davidson
ATTORNEYS

UNITED STATES PATENT OFFICE.

JULES LEVRECHON, OF AUBURN, NEW YORK.

HEATING APPARATUS.

SPECIFICATION forming part of Letters Patent No. 668,856, dated February 26, 1901.

Application filed October 8, 1900. Serial No. 32,422. (No model.)

*To all whom it may concern:*

Be it known that I, JULES LEVRECHON, of Auburn, in the county of Cayuga, in the State of New York, have invented new and useful Improvements in Heating Apparatus, of which the following, taken in connection with the accompanying drawings, is a full, clear, and exact description.

This invention relates to heating apparatus, and has for its object the production of a simple and practical device whereby a flowing current of water may be readily heated in transit and the products of combustion utilized for cooking or other purposes.

To this end the invention consists in the combination, construction, and arrangement of the parts of a heating apparatus, as hereinafter fully described, and pointed out in the claims.

Referring to the drawings, Figure 1 is a perspective view of a bath-tub and my improved heater, showing the applicability of said heater for heating a current of water passing therethrough and discharging into the bath-tub. Fig. 2 is a vertical sectional view through the center of the heating apparatus seen in Fig. 1. Fig. 3 is a transverse sectional view taken on line 3 3, Fig. 2.

My invention is designed to be connected to any cold-water-supply conduit for the purpose of heating the water in its transit through said heater and discharging the same into any desired receptacle; and it consists of outer and inner receptacles 1 and 2, telescoping with each other, the outer section forming, essentially, the combustion-chamber of the heater and the inner receptacle being adapted to receive the cold water.

The outer section 1 may be of any desired form or construction, and it preferably consists of an outer cylindrical shell having a bottom wall 3 and an opening 4 in its upper end for receiving the inner receptacle 2. The bottom wall 3 is provided with a substantially central aperture 5 and an upwardly-extending water-conduit 6, having its lower end surrounding the aperture 5 and secured to the bottom wall 3 and its upper end open and having its upper face disposed in substantially the same plane as the upper end face of the inclosing walls of said outer section.

The inner section 2 is detachably supported upon the outer section 1, is adapted to receive the cold water, and preferably consists of a cylindrical shell having its lower portion formed of less diameter than its upper portion and arranged to telescope within the outer section and its upper portion formed of greater diameter than the outer section for forming an annular bearing-face 7, adapted to rest upon the upper end face of the wall of the outer receptacle for supporting the inner receptacle in its operative position. This inner section is provided with lower and upper end walls 8 and 9, having apertures 10 and 11, which are connected to each other by suitable heat-flues 12, having their lower ends surrounding the apertures 10 and secured to the bottom wall 8 and their upper ends surrounding the apertures 11 and secured to the upper wall 9. The lower reduced portion of the inner cylinder 2, between the bearing-face 7 and the bottom wall 8, is preferably formed of less length than the outer section 1 for forming a combustion-chamber in the base of the said outer receptacle. The tubes 12 extend lengthwise through the interior of the section 2, their lower ends communicating with the combustion-chamber and their upper ends discharging the heated air or gases above the upper wall of the said inner receptacle.

The bottom wall 8 of the inner receptacle is provided with a substantially central aperture 13, which is usually of greater diameter than the water-tube 6 for receiving said water-tube when the sections are assembled.

14 is a suitable conduit having its lower end surrounding the opening 13 and secured to the bottom wall 8 and its upper end extending slightly above the upper end face of the tube 6 and provided with an end wall 15, adapted to rest upon the upper end face of said tube 6. This conduit 14 is also of greater diameter than the conduit 6 for forming a space between said conduits for receiving the heated products of combustion. The means for supplying water to the inner receptacle 2 usually consists of a conduit 16, having its lower end arranged in proximity to the bottom wall 8 and its upper end extended through an aperture 17 in the upper wall of the receptacle 2 and connected to any suitable source of water-supply.

Any suitable fuel may be used within the combustion-chamber of the outer section 1 for heating the water within the receptacle 2; but I preferably employ an ordinary gas-burner 20, supported within the base of the combustion-chamber of the outer section and connected by a pipe 21 to any desired source of gas-supply.

Arranged within the combustion-chamber, and preferably between the walls of the inner and outer receptacles, is a draft-pipe 21, having its lower end communicating with the combustion-chamber and its upper end communicating with the atmosphere in proximity to the upper end of the outer chamber 1.

The portion of the inclosing wall of the inner chamber adjacent to the draft-pipe is preferably depressed inwardly for forming a recess 23, which receives the draft-pipe 22 and permits the same to be removed when desired. The upright portion of the gas-supply pipe 21, which is connected to the burner, is usually arranged within the draft-pipe 22 and extends laterally through an aperture 24 in the upper end of the inclosing wall of the receptacle 1, said aperture also forming a means for communication between the atmosphere and the upper end of the draft-pipe. The upper portion of the inner receptacle 2 is provided with an outlet-opening 25 and a downwardly-deflected nipple 26, communicating with the opening 25, for discharging the heated water from the receptacle 2.

At Fig. 1 I have shown my improved heater in position for supplying heated water to an ordinary bath-tub A, which is provided with a water-supply pipe $a$ and an overflow-pipe $a'$. When used in this connection, the heater is usually supported upon the bottom wall of the bath-tub, and the overflow-pipe $a'$ is formed of less height than the distance between the bottom wall of the bath-tub and the opening 24 of the heater in order that the water discharged from the heater and flowing into the bath-tub may be prevented from flowing into the combustion-chamber of the heater through the opening 24. The water-supply conduit $a$ of the bath-tub is connected by a conduit 27 to the conduit 16, and the gas-feed pipe 21 is connected by a conduit 28 to a suitable gas-supply conduit B.

This heater is not only adapted for use in speedily and efficiently heating or boiling water during its passage through the inner chamber 2, but may also be used for cooking purposes simultaneously with its use as a water-heater. For this latter purpose the upper end wall of the inner section 2 is formed substantially flat for receiving and supporting any form of cooking utensil (not illustrated) in the path of the escaping products of combustion through the flues 12. In fact, a second water-heater may be thus superimposed above the flues 12 and provided with inlet and discharge openings for receiving and discharging water in substantially the same manner and for the same purposes as described for the receptacle 2.

In the operation of my invention the gas escaping through the burner 20 within the combustion-chamber of the heater is ignited and the products of combustion pass upwardly through the tubes 12. The water is admitted to the inner receptacle 2 through the supply-pipe 16 and entirely surrounds the flues 12 and central tube 14. The water is thus heated by the products of combustion in said flues 12 and the tube 14 and is discharged through the opening 25 into the bath-tub or other receptacle. The heater is usually supported a slight distance above the bottom wall of the bath-tub or other receptacle upon suitable supports 30 and permits the water to entirely surround the lower portion of the heater, and it rises within the central tube 6, thereby additionally heating the water which is within the bath-tub or other receptacle in which the heater is placed. When the heated water rises to a certain height beneath the opening 24, it overflows into the overflow-conduit $a'$ and prevents the water from overflowing into the combustion-chamber.

The operation of my invention will now be readily understood upon reference to the foregoing description and the accompanying drawings, and it will be noted that considerable change may be made in the means for supplying heat to the combustion-chamber and that other changes may be made in the detail construction and arrangement of the parts of my invention without departing from the spirit thereof. Therefore I do not limit myself to the precise construction and arrangement shown and described.

Having thus fully described my invention, what I claim, and desire to secure by Letters Patent, is—

1. A heating apparatus comprising hollow telescoping sections, the outer section being formed with a combustion-chamber, and the other being provided with a water-chamber and an enlarged upper end resting on the upper end of the outer section and provided with a discharge-opening.

2. A heating apparatus comprising hollow telescoping sections detachable from each other, the outer section being formed with a combustion-chamber and the other being provided with a water-chamber having its lower end formed of less diameter than its upper end and extending within the combustion-chamber, said upper end being formed of greater diameter than the outer section and resting on the upper end of said outer section.

3. A heating apparatus comprising hollow telescoping sections, the outer section being formed with a combustion-chamber and the other being provided with a water-chamber and heat-flues extending through the opposite end walls of the water-chamber and communicating with the combustion-chamber, the upper end of the inner section being formed of greater diameter than the outer section and provided with a discharge-opening.

4. A heating apparatus comprising an outer section having a combustion-chamber, a water-receptacle telescoping within the outer section and provided with inlet and outlet openings for the water, and heat-flues extending through the upper and lower walls of the water-receptacle and communicating with the combustion-chamber, said water-receptacle having a heat-tube extending upwardly from its bottom wall and having its upper end closed and its lower end communicating with the combustion-chamber.

5. A heating apparatus comprising an outer section having a combustion-chamber, and a water-conduit extending upwardly from its bottom wall through the combustion-chamber, a water-receptacle telescoping within the outer section and provided with inlet and outlet openings for the water and a tube telescoping with said conduit.

6. A heating apparatus comprising an outer section having a combustion-chamber and a water-conduit extending upwardly from its bottom wall through the combustion-chamber, and a water-receptacle provided with a tube telescoping with the water-conduit and communicating with the combustion-chamber.

7. A heating apparatus comprising an outer section having a combustion-chamber, a water-chamber having its lower end telescoping within the outer section and its upper end formed of greater diameter than the outer section and adapted to rest on the upper end of the outer section, said water-chamber being provided with heat-flues extending through its opposite end walls and communicating with the combustion-chamber, the enlarged upper end of the water-chamber being provided with inlet and outlet openings above the outer section and a burner interposed between the bottom walls of said sections.

8. A heating apparatus comprising an outer section having a combustion-chamber and an open upper end, a water-chamber removably supported in the opening of the outer section and having its bottom wall separated from the bottom wall of the outer section and provided with an opening and a conduit extending upwardly from the opening and closed at its upper end and a burner interposed between said bottom walls.

9. A heating apparatus comprising an outer section having a combustion-chamber and an open upper end, a water-chamber removably supported in the opening of the outer section and having its bottom wall separated from the bottom wall of the outer section, the upper end of the water-chamber being of greater diameter than the outer section and provided with a discharge-opening, a burner interposed between said bottom walls, a draft-conduit removably supported between the walls of the outer and inner sections and communicating with the space between said outer walls, and a fuel-supply pipe connected to the burner and extended upwardly through the draft-conduit.

10. A heating apparatus comprising an outer section having its bottom wall provided with an opening, a conduit extending upwardly from the opening, a water-section telescoping within the former section and having opposite end walls provided with apertures, the bottom wall of the water-section being provided with an additional opening, flues connecting the lower and upper apertures of the water-section, an additional flue extending upwardly from said additional opening and surrounding the conduit, and a burner interposed between the bottom walls of the outer and inner sections.

In witness whereof I have hereunto set my hand this 22d day of September, 1900.

JULES LEVRECHON.

Witnesses:
D. E. FRENCH,
M. C. BACHMAN.